P. AGRILLO.
CHAIN.
APPLICATION FILED SEPT. 7, 1915.

1,177,079.   Patented Mar. 28, 1916.

WITNESSES
Edw. S. Hall.
Benj. R. Newcomb.

INVENTOR
Paul Agrillo.

BY Richard Owen,
ATTORNEY

UNITED STATES PATENT OFFICE.

PAUL AGRILLO, OF SAN JOSE, CALIFORNIA.

CHAIN.

1,177,079.  Specification of Letters Patent.  Patented Mar. 28, 1916.

Application filed September 7, 1915. Serial No. 49,353.

*To all whom it may concern:*

Be it known that I, PAUL AGRILLO, a citizen of the United States, residing at San Jose, in the county of Santa Clara and State of California, have invented certain new and useful Improvements in Chains, of which the following is a specification.

My invention appertains to a chain, and particularly to that class of chains wherein the links are formed of flexible material such as leather or the like.

One object resides in providing a chain of the above-mentioned character wherein a portion of each succeeding link overlaps, and thereby reinforces, a portion of the next succeeding link or vice versa.

Another object resides in providing a series of interconnected links so arranged that every third link of a series of three links connects with both the first and second link of the series and thereby forms a continuously reinforced chain.

Figure 1:
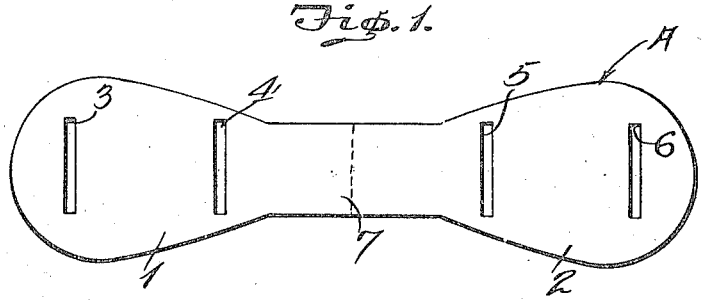
Figure 2:
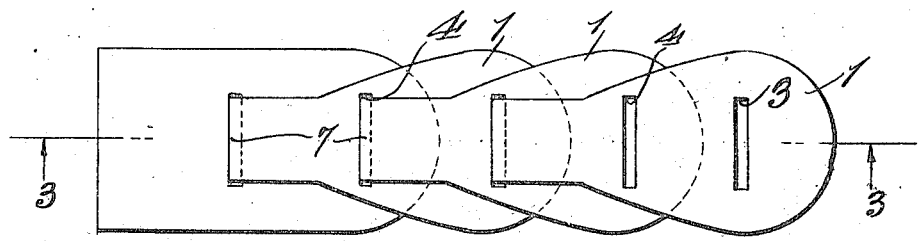
Figure 3:
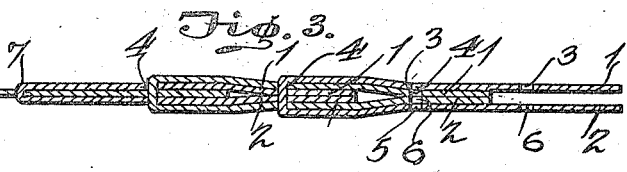

In the drawings annexed hereto and forming a part of this specification in which I have illustrated specific embodiments of my invention: Figure 1 is a plan view of one link opened out. Fig. 2 is a plan view of a series of links like that shown in Fig. 1, said links being assembled to form the portion of a chain. Fig. 3 is a sectional view on the line 3—3 of Fig. 2, and Fig. 4 is a plan view of a modified form of link.

The links similar to Fig. 1 are constructed and assembled to form a chain, such as shown in Figs. 2 and 3, in the following manner: Each link A comprises the end portions 1 and 2 transversely slitted as shown at 3, 4, 5 and 6, said end portions being connected by a looped portion 7. In assembling the links the first link is doubled on itself as indicated by the dotted line in Fig. 1, so that slits 4 and 5 and slits 3 and 6 register; then the end 1 of the second link of the series is passed through slits 4 and 5 of the first link and doubled over that is slits 4 and 5 of the second link register with slits 3 and 6 of the first link, the third link is similarly assembled, that is to say, the end of the third link is passed through slits 3 and 6 of the first link and 4 and 5 of the second link. Similarly by the use of additional links assembled in like manner in length the chain desired may be formed and the overlapping relation of the links forms a reinforcement for the entire chain.

Figure 4:
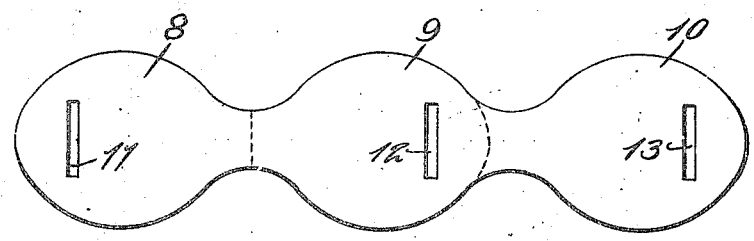

The modified form of link shown in Fig. 4 comprises three sections, namely, 8, 9 and 10, said sections being slitted at 11, 12 and 13, respectively. In assembling these links the sections 8 and 9 are doubled over so that slits 11 and 12 register, then section 8 of the second link is inserted through slits 11 and 12 of the first link and doubled over so that slits 11 and 12 of the second link register with slit 13 of the first link, and thus by a similar assembly of additional links a continuous chain may be formed.

In the case of each type of link it is to be noted that out of the series of three links each third link connects with the first link of the series.

While I have herein shown and described specific, practical embodiments of my invention, it is to be understood that this showing is merely by way of illustrating the principles of the invention, and that I do not confine the invention to such illustration except in so far as the appended claims import.

I claim:—

1. A chain comprising a series of links, each link consisting of a looped portion and two adjacent ends, said ends having registering slits adjacent the looped portion and adjacent the forward edges of said ends, the looped portion of the second link being passed through and doubled over in the slits nearest the looped portion of the first link, and the looped portion of the third link being passed through the slits nearest the forward edges of the first link and also the slits nearest the looped portion of the second link, and so on with each succeeding link to form a continuously reinforced chain, substantially as described.

2. A chain comprising a series of links, each provided with a looped portion and alined end portions having slits, the looped portion of each succeeding link passing through the slits of the preceding links and having a portion adapted to register with a portion of the next preceding link to reinforce the links and form a continuous chain, substantially as described.

In testimony whereof I affix my signature in presence of two witnesses.

PAUL AGRILLO.

Witnesses:
I. RANCADORE,
GIUSEPPE AGRILLO.